United States Patent
Poteat et al.

[11] Patent Number: 5,970,245
[45] Date of Patent: Oct. 19, 1999

[54] METHOD FOR DEBUGGING SHARED PROCEDURES CONTAINED IN DYNAMIC LINK LIBRARY FILES

[75] Inventors: Billy Eugene Poteat, Columbia; Devesh Shah, Cayce, both of S.C.

[73] Assignee: NCR Corporation, Dayton, Ohio

[21] Appl. No.: 08/779,854

[22] Filed: Jan. 3, 1997

[51] Int. Cl.$^6$ .................................................. G06F 9/445
[52] U.S. Cl. ........................................................ 395/704
[58] Field of Search .................................. 395/704, 685, 395/705, 706, 707

[56] References Cited

U.S. PATENT DOCUMENTS

| | | | |
|---|---|---|---|
| 5,247,681 | 9/1993 | Janis et al. | 395/685 |
| 5,437,006 | 7/1995 | Turski | 707/503 |
| 5,745,767 | 4/1998 | Rosen et al. | 395/704 |
| 5,761,510 | 6/1998 | Smith, Jr. et al. | 395/704 |
| 5,889,988 | 3/1999 | Held | 395/673 |

OTHER PUBLICATIONS

Frumkin et al., "Trace–Driven Debugging of Message Passing Programs", IEEE, pp. 753–762, 1998.
Yu et al., "A New Approach to Simulation Debugging Environment Construction", IEEE, pp. 1412–1417, 1996.
Cheng et al., "A Portable Debugger for Parallel and Distributed Programs", IEEE, pp. 723–732, 1994.
Tom Hand, "Debugging Embedded Systems Implemented in C", ACM, pp. 17–22, 1991.

*Primary Examiner*—Allen R. MacDonald
*Assistant Examiner*—Ted T. Vo
*Attorney, Agent, or Firm*—Gates & Cooper

[57] ABSTRACT

A method, apparatus, and article of manufacture for debugging target procedures contained in an object library or dynamic link library (DLL) on a running computer system. A "trace" DLL is created, wherein the trace DLL comprises a plurality of trace procedures. The trace procedures have a one-to-one correspondence with the target procedures contained in a target DLL. The trace DLL then acts as an interface between a software application and the target DLL. Rather than invoking the target procedure in the target DLL, the software application invokes the trace procedure contained in the trace DLL. In turn, the trace function in the trace DLL invokes the target procedure in the target DLL through an alternative entry point. The trace procedure may include debug statements, breakpoints, trace functions, printing functions, and other instructions that are executed before and after the call to the alternative entry point in the corresponding target procedure in the target DLL. In this manner, the calls to the target procedure in the target DLL may be monitored without disrupting the functionality of the target procedure or limiting access to the target DLL.

24 Claims, 5 Drawing Sheets

METHOD FOR DEBUGGING SHARED PROCEDURES CONTAINED IN DYNAMIC LINK LIBRARY FILES

BACKGROUND OF THE INVENTION

1. Field of the Invention

The present invention generally relates to a method for debugging software applications. In particular, the invention provides the capability to debug shared procedures contained in an object library or dynamic link library (DLL) on a running computer system, without limiting any other application's access to the shared procedures.

2. Description of Related Art

Using conventional debugging techniques to find a problem in a software application is difficult when the application uses shared procedures or routines contained in an object library or DLL. To find errors in the shared procedures, users must place debug statements and/or breakpoints within the shared procedures or use debugger routines that prevent others from accessing the procedures. However, these debugging techniques disrupt running computer systems because they affect the functionality of the shared procedures. Thus, there is a need in the art for debugging techniques that do not limit access to shared procedures or affect the functionality of shared procedures.

SUMMARY OF THE INVENTION

To overcome the limitations in the prior art described above, the present invention discloses a method, apparatus, and article of manufacture for debugging shared procedures contained in an object library or dynamic link library (DLL) on a running computer system. A "trace" DLL is created, wherein the trace DLL comprises a plurality of trace procedures. The trace procedures have a one-to-one correspondence with the shared target procedures contained in a target DLL. The trace DLL then acts as an interface between a software application and the target DLL. Rather than invoking the target procedure in the target DLL, the software application invokes the trace procedure contained in the trace DLL. In turn, the trace function in the trace DLL invokes the target procedure in the target DLL through an alternative entry point. The trace procedure may include debug statements, breakpoints, trace functions, printing functions, and other instructions that are executed before and after the call to the alternative entry point in the corresponding target procedure in the target DLL. In this manner, the calls to the target procedure in the target DLL may be monitored without disrupting the functionality of the target procedure or limiting access to the target DLL.

BRIEF DESCRIPTION OF THE DRAWINGS

Referring now to the drawings in which like reference numbers represent corresponding parts throughout.

DETAILED DESCRIPTION OF THE INVENTION

In the following description, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Figure 1:
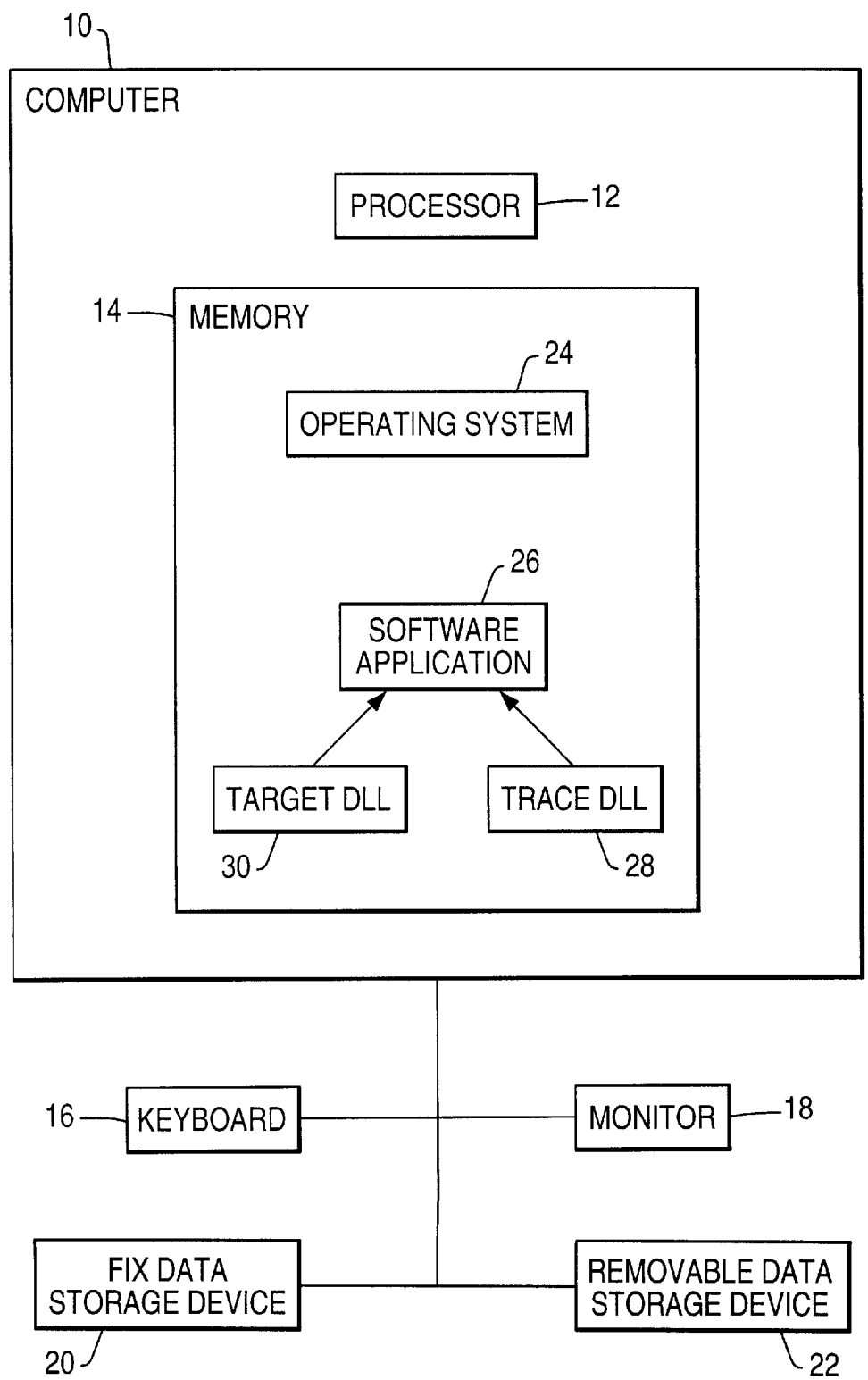
FIG. 1 is a block diagram that illustrates an exemplary hardware environment of the present invention.

FIG. 1 is a block diagram that illustrates an exemplary hardware environment of the present invention. The present invention is typically implemented using a personal computer 10 comprised of a processor 12, random access memory (RAM) 14, and other components. It is envisioned that attached to the personal computer 10 may be a keyboard 16, monitor 18, fixed data storage devices 20 and/or removable data storage devices 22. Those skilled in the art will recognize that the exemplary environment illustrated in FIG. 1 is not intended to limit the present invention. Indeed, those skilled in the art will recognize that other alternative hardware environments may be used without departing from the scope of the present invention.

The computer 10 operates under the control of an operating system 24, and executes the instructions associated with a software application 26, trace DLL 28 and target DLL 30. The software application 26 is optionally and selectively linked to the trace DLL 28 and target DLL 30. The target DLL 30 contains one or more target procedures invoked by the software application 26 during its normal execution, when the target DLL 30 is linked to the software application 26. However, the trace DLL 28 contains one or more trace procedures for these target procedures that are invoked by the software application 26 during debugging execution, when the trace DLL 28 is linked to the software application 26.

The trace procedures in the trace DLL 28 have a one-to-one correspondence with the target procedures contained in the target DLL 30. The trace DLL 28 then acts as an interface between the software application 26 and the target DLL 30. In this situation, rather than invoking the target procedure in the target DLL 30, the software application 26 invokes the corresponding trace procedure contained in the trace DLL 28. The trace procedure may include debug statements, breakpoints, trace outputs (such as the name of the target procedure, a list of parameter values for the target procedure, and a return value from the target procedure), and other instructions executed before and/or after the call to the corresponding target procedure in the target DLL 30. In this manner, the calls to the target procedure in the target DLL 30 may be debugged, traced, and monitored without disrupting the functionality of the target procedure or limiting access to the target DLL 30.

Generally, the operating system 24, software application 26, trace DLL 28, and target DLL 30 are tangibly embodied in the memory 14 and/or one or more of the data storage devices 20–22, and/or are received from one or more of data communication devices (not shown) coupled to the computer 10. Further, the operating system 24, software application 26, trace DLL 28, and target DLL 30 may be loaded from the data storage devices 20–22 into the memory 14 of the computer 10 for execution by the processor 12. In any embodiment, the operating system 24, software application 26, trace DLL 28, and target DLL 30 together comprise instructions which, when read and executed by the processor 12 of the computer 10, causes the computer 10 to perform the steps necessary to execute the steps or elements of the present invention.

Figure 2:
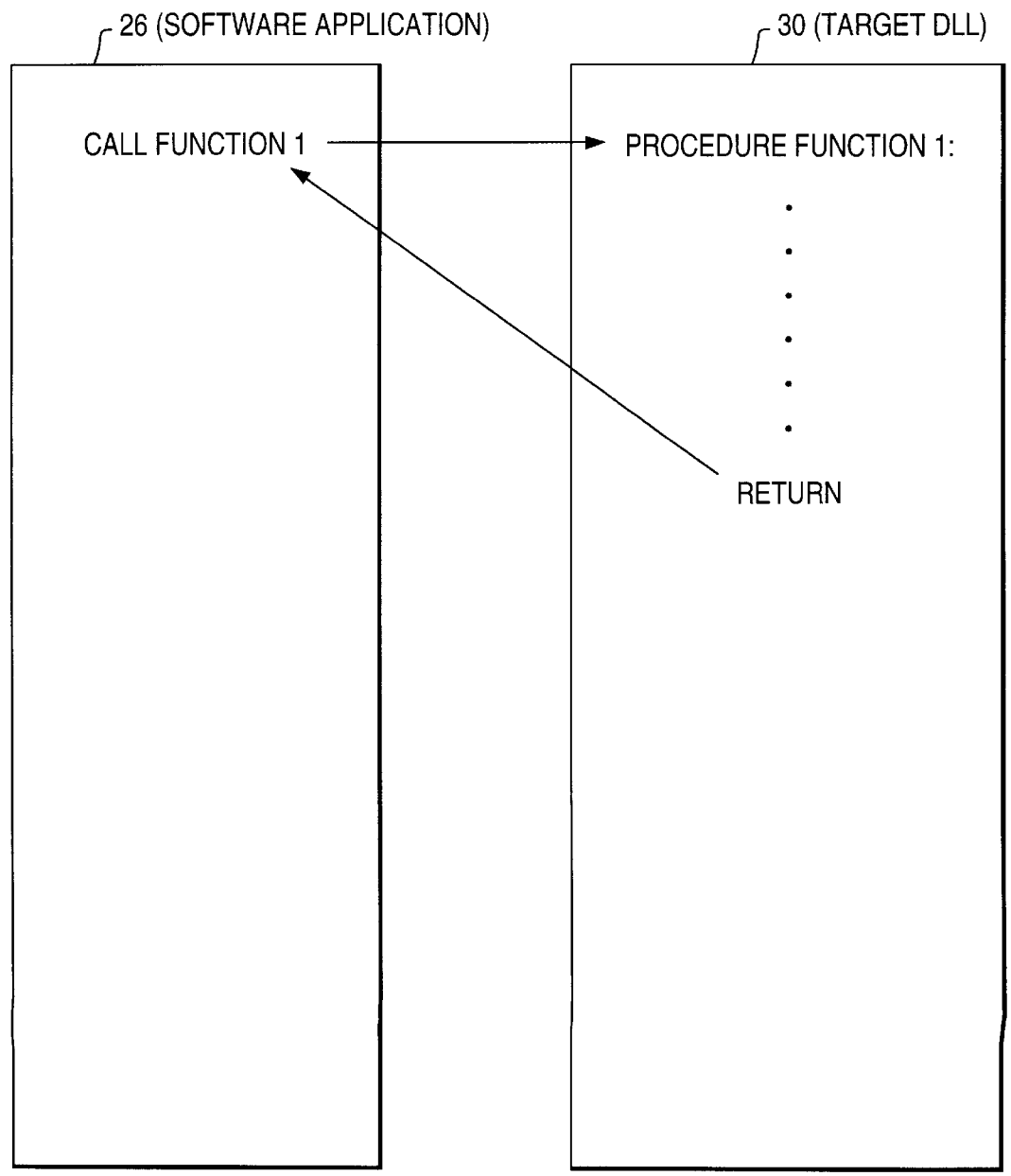
FIG. 2 is a block diagram that illustrates the calling sequence in the prior art when a software application invokes a target procedure (i.e., FUNCTION1) in a target dynamic link library.

FIG. 2 is a block diagram that illustrates a calling sequence in the prior art when the software application 26 invokes a target procedure (i.e., FUNCTION1) in the target DLL 30. The address for the target procedure is generally resolved by a component (e.g., a linker/loader) of the operating system 24 at run-time, so that when the target procedure is invoked by the software application 26, control is transferred to the target procedure in the target DLL 30. Further, when the target procedure in the target DLL 30 executes a return instruction, control is transferred back to the software application 26.

Figure 3:
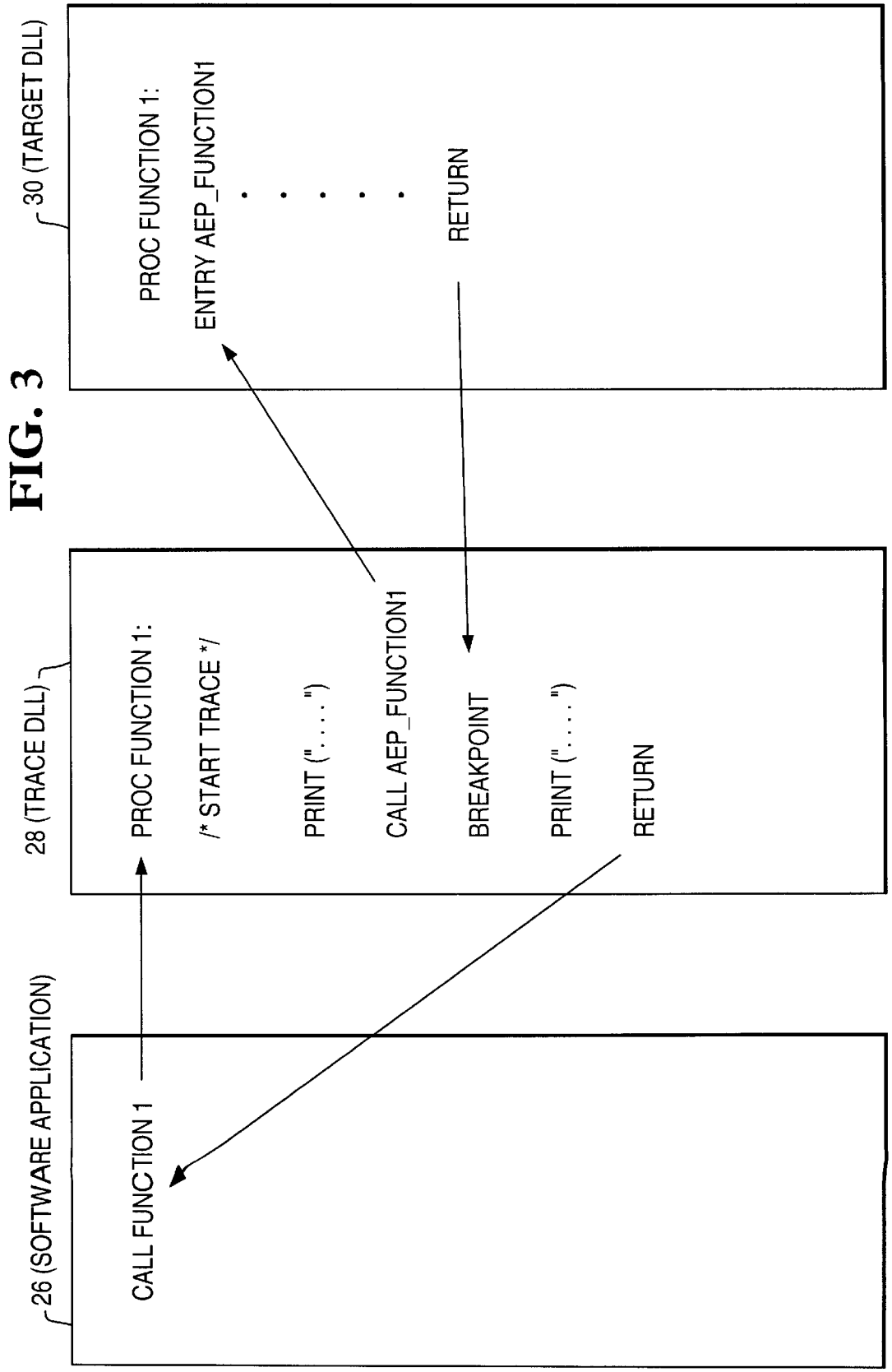
FIG. 3 is a block diagram that illustrates the calling sequence in the present invention when a software application invokes a target procedure (i.e., FUNCTION1) in a target dynamic link library.

FIG. 3 is a block diagram that illustrates a calling sequence in the present invention when the software application 26 invokes a target procedure (i.e., FUNCTION1) in the target DLL 30. However, in this situation, the trace DLL 28 has been linked to the software application 26, so that when the target procedure is invoked by the software application 26, control is transferred to the corresponding trace procedure (i.e., FUNCTION1) in the trace DLL 28. The target DLL 30 has also been linked, either to the software application 26 or the trace DLL 28, so that the trace procedure in the trace DLL 28 can invoke the target procedure. However, the trace DLL 28 invokes an alternative entry point (i.e., AEP_FUNCTION1) within the target procedure in the target DLL 30. In this way, even though the trace DLL 28 and target DLL 30 have procedures with the same name (i.e., the trace procedure and the target procedure), the trace procedures in the trace DLL 28 preempt the target procedures in the target DLL 30. However, the use of the alternative entry point allows the trace procedure in the trace DLL 28 to invoke the target procedure of the target DLL 30.

Figure 4:
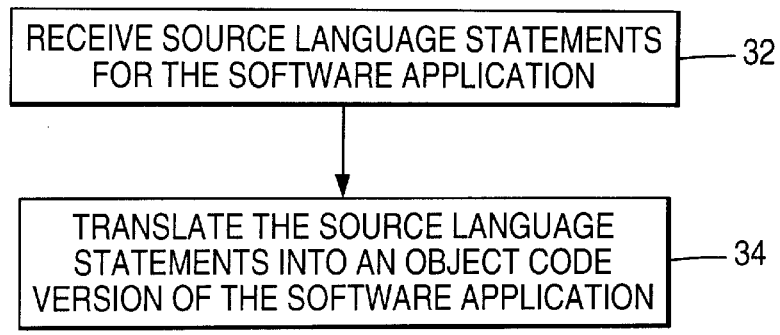
FIG. 4 is a flowchart illustrating the general flow performed for the preparation of the software application to accomplish the present invention.

FIG. 4 is a flowchart illustrating the general flow performed for the preparation of the software application 26 to accomplish the present invention. Block 32 represents a compiler executed by the computer 10 receiving source language statements comprising the software application 26 into the memory 14 of the computer 10, wherein at least one of the statements comprises an invocation of a target procedure in the target DLL 30. Following block 32, block 34 represents the compiler translating the source language statements into an object code version of the software application 26 in the memory of the computer 10, wherein the object code version of the software application 26 includes instructions for invoking one or more of the target procedures in the target DLL 30.

Figure 5:
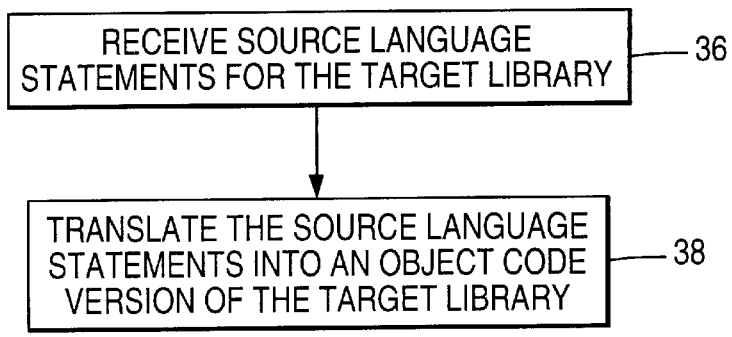
FIG. 5 is a flowchart illustrating the general flow performed for the preparation of the target dynamic link library to accomplish the present invention.

FIG. 5 is a flowchart illustrating the general flow performed for the preparation of the target DLL 30 to accomplish the present invention. Block 36 represents a compiler executed by the computer 10 receiving source language statements comprising the target DLL 30 into the memory 14 of the computer 10, wherein at least some of the statements comprises one or more target procedures and the target procedures have an alternative entry point. Following block 36, block 38 represents the compiler translating the source language statements into an object code version of the target DLL 30 in the memory 14 of the computer 10, wherein the object code version of the target DLL 30 includes instructions for one or more of the target procedures and alternative entry points therefor.

Figure 6:
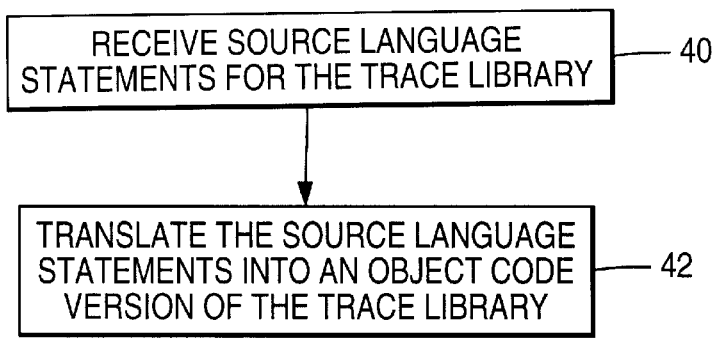
FIG. 6 is a flowchart illustrating the general flow performed for the preparation of the trace dynamic link library to accomplish the present invention.

FIG. 6 is a flowchart illustrating the general flow performed for the preparation of the trace DLL 28 to accomplish the present invention. Block 40 represents a compiler executed by the computer 10 receiving source language statements comprising the trace DLL 30 into the memory 14 of the computer 10, wherein at least some of the statements comprises one or more trace procedures that perform debug functions before and/or after invoking the target procedures in the target DLL 30 via their alternative entry point. Following block 40, block 42 represents the compiler translating the source language statements into an object code version of the trace DLL 30 in the memory 14 of the computer 10, wherein the object code version of the target DLL 30 includes instructions for one or more of the trace procedures.

Figure 7:
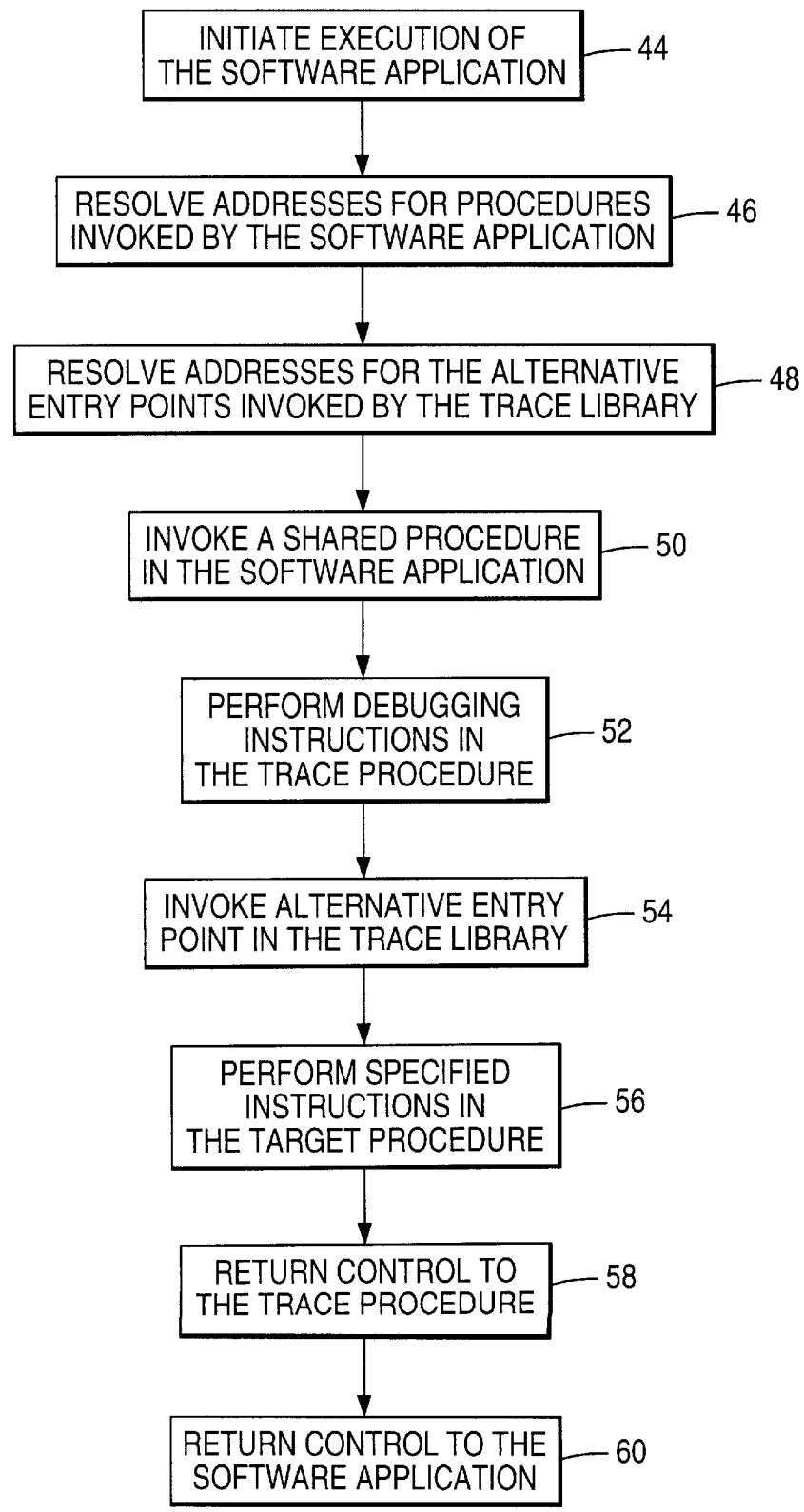
FIG. 7 is a flowchart illustrating the general flow performed for the execution of a software application, trace dynamic link library, and target dynamic link library to accomplish the present invention.

FIG. 7 is a flowchart illustrating the general flow performed for the execution of the software application 26, trace DLL 28, and target DLL 30 to accomplish the present invention. Block 44 represents a linker/loader, executed by the computer 10, initiating execution of the software application 26, wherein the trace DLL 28 and target DLL 30 are selectively linked to the software application 26. Block 46 represents the linker/loader resolving addresses for procedures invoked by the software application to the trace DLL 28 and target DLL 30 in such a way that the trace procedures in the trace DLL 28 preempt or take precedence over the corresponding target procedures in the target DLL 30. Block 48 represents the linker/loader resolving addresses for alternative entry points for target procedures called by the trace DLL 28 to the target DLL 30. Block 50 represents the software application 26 calling a target procedure (e.g., FUNCTION1), which normally would cause a transfer of control to the target procedure FUNCTION1 in the target DLL 30. However, in this situation, the trace DLL 28 has been linked to the software application 26, so that the call of the target procedure FUNCTION1 by the software application 26 is re-directed to the corresponding trace procedure FUNCTION1 in the trace DLL 28. Block 52 represents the trace procedure FUNCTION1 in the trace DLL 28 performing whatever debugging instructions have been specified prior to calling the alternative entry point (e.g., AEP_FUNCTION1) into the target procedure FUNCTION1 of the target DLL 30. Block 54 represents the trace function FUNCTION1 invoking the alternative entry point AEP_FUNCTION1 into the target procedure FUNCTION1 of the target DLL 30 (in essence calling the target procedure FUNCTION1). Block 56 represents the target procedure FUNCTION1 in the target DLL 30 performing its specified functions, and Block 58 represents control being returned to the calling trace procedure FUNCTION1 in the trace DLL 28 upon completion of the target procedure FUNCTION1. Block 58 represents the trace procedure FUNCTION1 in the trace DLL 28 performing whatever debugging instructions have been specified after the return of control from the target procedure FUNCTION1 of the target DLL 30. Finally, Block 60 represents control being returned to the software application 26 upon completion of the trace procedure FUNCTION1 in the trace DLL 28.

As a result of these steps, the present invention provides the capability to debug target procedures contained in a target DLL 30 on a running computer system, without disrupting or limiting any other application's access to the target procedures. By using a trace DLL 28 having trace procedures that have a one-to-one correspondence to the target procedures in the target DLL 30, the software application 26 invokes the trace procedures in the trace DLL 28 rather than the target procedures in the target DLL 30, and the trace procedures in the trace DLL 28 then invoke the target procedures in the target DLL 30. Using these trace procedures, the target procedures contained in the target DLL 30 can be debugged, traced, and monitored.

Conclusion

In summary, the present invention discloses a method, apparatus, and article of manufacture for debugging target procedures contained in an object library or dynamic link library (DLL) on a running computer system. A "trace" DLL is created, wherein the trace DLL comprises a plurality of trace procedures. The trace procedures have a one-to-one correspondence with the target procedures contained in a target DLL. The trace DLL then acts as an interface between a software application and the target DLL. Rather than invoking the target procedure in the target DLL, the software application invokes the trace procedure contained in the trace DLL. In turn, the trace function in the trace DLL invokes the target procedure in the target DLL through an alternative entry point. The trace procedure may include debug statements, breakpoints, trace functions, printing functions, and other instructions that are executed before and after the call to the alternative entry point in the corresponding target procedure in the target DLL. In this manner, the calls to the target procedure in the target DLL may be monitored without disrupting the functionality of the target procedure or limiting access to the target DLL.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of debugging target procedures contained in an object library on a computer system, comprising the steps of:

selectively linking both a trace library and a target library to a software application in a memory of the computer, wherein the target library contains a target procedure and the trace library contains a trace procedure with the same name as the target procedure;

re-directing a call by the software application from the target procedure to the trace procedure, so that the trace procedure preempts the target procedure; and performing a call to an alternative entry point within the target procedure from the trace procedure, in order to monitor calls to the target procedure without disrupting the functionality of the target procedure.

2. The method of claim 1, further comprising the step of executing one or more debugging instructions within the trace procedure after the re-directed call.

3. The method of claim 2, wherein the executing step further comprises the step of printing a plurality of trace outputs related to the target function in the target library.

4. The method of claim 3 above, wherein the trace output is one or more outputs selected from a group comprising a name of the target procedure, a list of parameter values for the target procedure, and a return value from the target procedure.

5. The method of claim 1, wherein the target library comprises a plurality of target procedures.

6. The method of claim 5, wherein the trace library comprises a plurality of trace procedures.

7. The method of claim 6, wherein the trace procedures in the trace library have a one-to-one correspondence with the target procedures in the target library.

8. The method of claim 1, wherein the performing step comprises the step of invoking the target procedure in the target library through an alternative entry point in the target procedure.

9. A computer-implemented apparatus for debugging target procedures contained in an object library, comprising:

a computer having a memory, the computer storing a software application, target library, and trace library;

means, performed by the computer, for selectvely linking both the trace library and the target library to the software application in the memory of the computer, wherein the target library contains a target procedure and the trace library contains a trace procedure with the same name as the target procedure;

means, performed by the computer, for re-directing a call by the software application from the target procedure to the trace procedure, so that the trace procedure pre-empts the target procedure; and means, performed by the computer, for performing a call to an alternative entry point within the target procedure from within the trace procedure, in order to monitor calls to the target procedure without disrupting the functionality of the target procedure.

10. A program storage device, readable by a computer having a memory, tangibly embodying one or more programs of instructions executable by the computer to perform the steps of:

selectively linking both a trace library and a target library to a softrware application in a memory of the computer, wherein the target library contains a target procedure and the trace library contains a trace procedure with the same name as the target procedure;

re-directing a call by the software application from the target procedure to the trace procedure, so that the trace procedure preempts the target procedure; and performing a call to an alternative entry point within the target procedure from the trace procedure, in order to monitor calls to the target procedure without disrupting the functionality of the target procedure.

11. The apparatus of claim 9, further comprising means for executing one or more debugging instructions within the trace procedure after the re-directed call.

12. The apparatus of claim 11, wherein the means for executing further comprises means for printing a plurality of trace outputs related to the target function in the target library.

13. The apparatus of claim 12 above, wherein the trace output is one or more outputs selected from a group comprising a name of the target procedure, a list of parameter values for the target procedure, and a return value from the target procedure.

14. The apparatus of claim 9, wherein the target library comprises a plurality of target procedures.

15. The apparatus of claim 14, wherein the trace library comprises a plurality of trace procedures.

16. The apparatus of claim 15, wherein the trace procedures in the trace library have a one-to-one correspondence with the target procedures in the target library.

17. The apparatus of claim 9, wherein the means for performing comprises means for invoking the target procedure in the target library through an alternative entry point in the target procedure.

18. The method of claim 10, further comprising the step of executing one or more debugging instructions within the trace procedure after the re-directed call.

19. The method of claim 18, wherein the executing step further comprises the step of printing a plurality of trace outputs related to the target function in the target library.

20. The method of claim 19 above, wherein the trace output is one or more outputs selected from a group comprising a name of the target procedure, a list of parameter values for the target procedure, and a return value from the target procedure.

21. The method of claim 10, wherein the target library comprises a plurality of target procedures.

22. The method of claim 21, wherein the trace library comprises a plurality of trace procedures.

23. The method of claim 22, wherein the trace procedures in the trace library have a one-to-one correspondence with the target procedures in the target library.

24. The method of claim 10, wherein the performing step comprises the step of invoking the target procedure in the target library through an alternative entry point in the target procedure.

* * * * *